N. V. JOHNSON.
HYDRAULIC MOTOR.
APPLICATION FILED AUG. 8, 1911.

1,024,340.

Patented Apr. 23, 1912.
3 SHEETS—SHEET 1.

N. V. Johnson, Inventor

Witnesses by C. A. Snow & Co., Attorneys

N. V. JOHNSON.
HYDRAULIC MOTOR.
APPLICATION FILED AUG. 8, 1911.

1,024,340.

Patented Apr. 23, 1912.
3 SHEETS—SHEET 2.

N. V. Johnson, Inventor

Witnesses by C. A. Snow & Co.
Attorneys

N. V. JOHNSON.
HYDRAULIC MOTOR.
APPLICATION FILED AUG. 8, 1911.
1,024,340.
Patented Apr. 23, 1912.
3 SHEETS—SHEET 3.
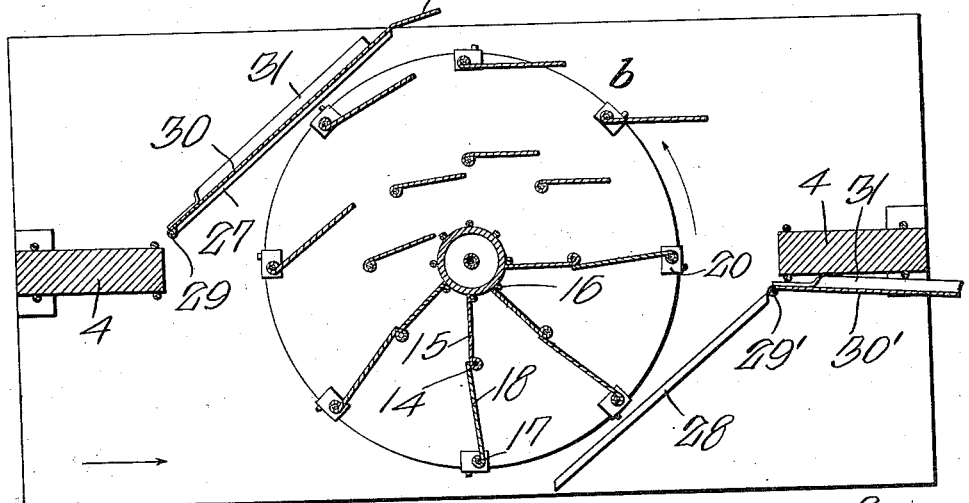
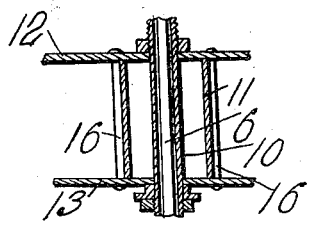
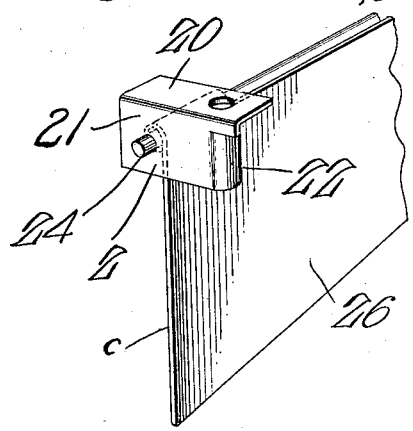
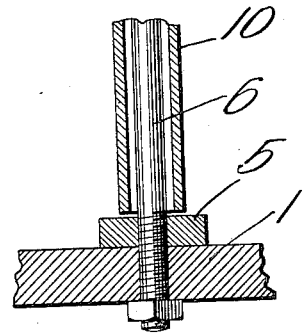
N. V. Johnson  Inventor
by C. A. Snow & Co.
Attorneys

UNITED STATES PATENT OFFICE.

NIEL VICTOR JOHNSON, OF SEATTLE, WASHINGTON.

HYDRAULIC MOTOR.

1,024,340.

Specification of Letters Patent. Patented Apr. 23, 1912.

Application filed August 8, 1911. Serial No. 642,971.

*To all whom it may concern:*

Be it known that I, NIEL V. JOHNSON, a citizen of the United States, residing at Seattle, in the county of King and State of Washington, have invented a new and useful Hydraulic Motor, of which the following is a specification.

The present invention relates to improvements in hydraulic motors, the primary object of the invention being the provision of a horizontally disposed water wheel, provided with two coöperatively disposed series of blades, and shutters or cut-offs for conveying the water, caused by waves, the tide or a current, to said blades so that the wheel will under all conditions rotate in but one direction, whereby the change of current, due to the change of tide will rotate the wheel in the same direction, and a still further object of the invention is the provision of a wheel having in conjunction with the blades between the circular disks, a series of radially disposed and hung wings, V-shaped in elevation mounted below the bottom disk, and having their bases toward the periphery of the wheel, whereby as the wheel is rotated, water is prevented from accumulating at the center of the wheel to retard the same, the reduced ends of the wings being disposed toward the center, and leaving the center space below the wheel clear.

With the above and other objects in view, which will appear as the description proceeds, the invention resides in the construction and arrangement of parts and in the details of construction hereinafter described and claimed, it being understood that changes in the precise embodiment of the invention herein disclosed can be made within the scope of what is claimed without departing from the spirit of the invention.

Figure 1:
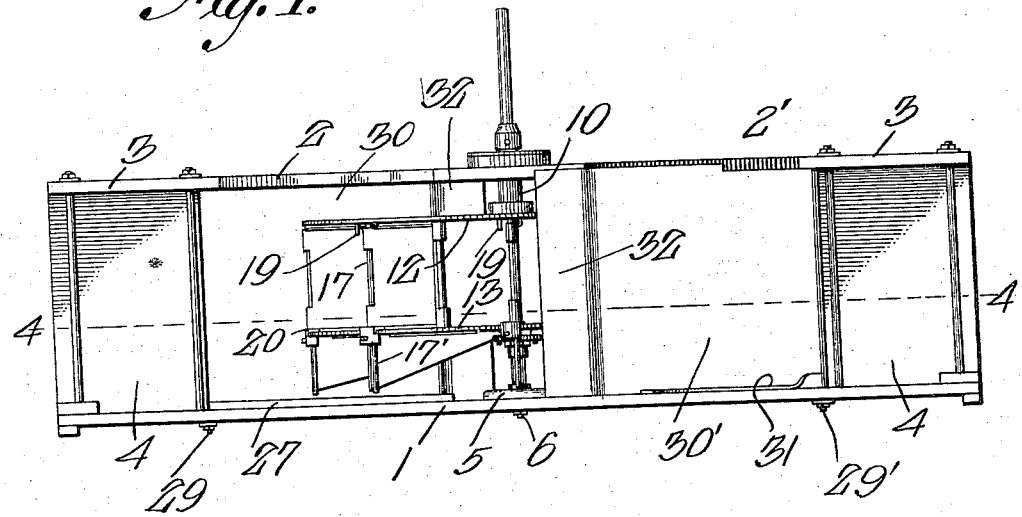
Figure 2:
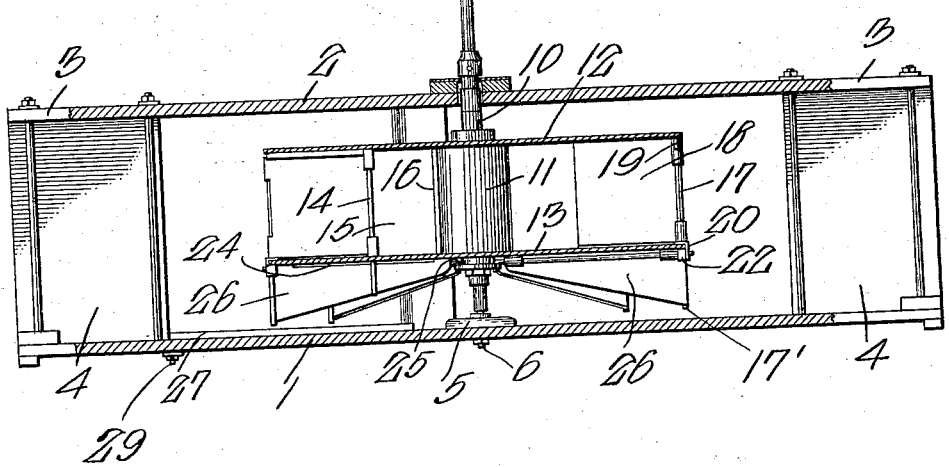
Figure 3:
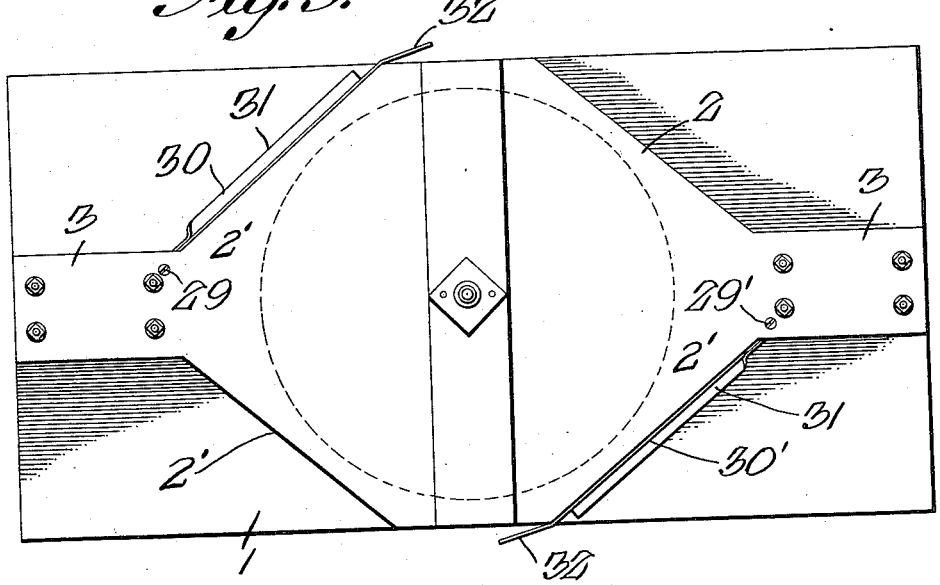
Figure 4:
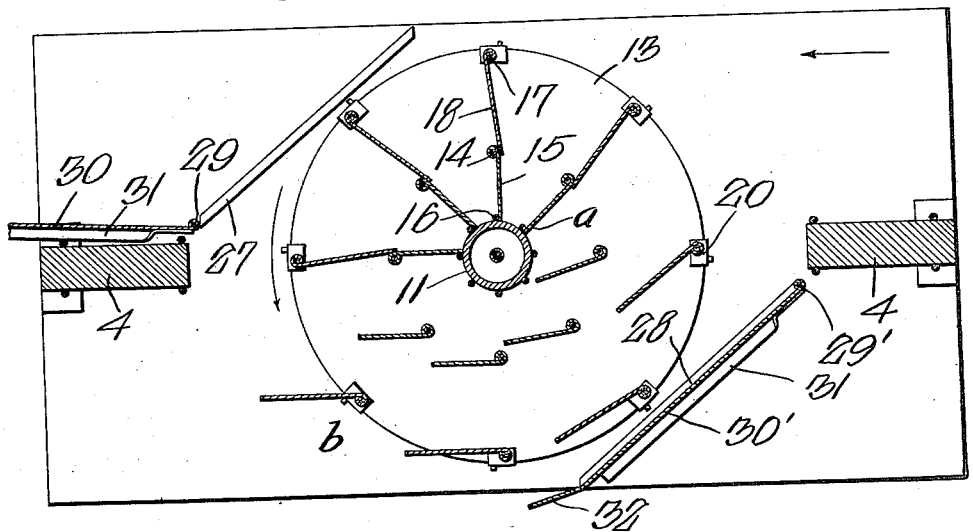

In the drawings:—Figure 1 is a side elevation of the complete hydraulic motor, the power shaft being broken away. Fig. 2 is a longitudinal central sectional view thereof. Fig. 3 is a top plan view of the motor. Fig. 4 is a cross section taken on line 4—4 of Fig. 1, the arrow indicating the direction of flow of water and the positioning of the parts of the motor at such time. Fig. 5 is a similar view, the parts assuming the position upon a reversal of flow of water as indicated by the arrow. Fig. 6 is a perspective view of the lower supporting and attaching plate for the other vertically journaled blades and for the lower swinging or depending wings or blades. Fig. 7 is a vertical section showing the details of journaling of the shaft of the wheel. Fig. 8 is a detail sectional view through the upper and lower disks of the motor showing the positioning of the central cylinder and adjacent portions.

Referring to the drawings, the numeral 1 designates the lower plate of the main frame, and 2 the top plate, having the oppositely disposed reduced projecting ends 3, connected to and spaced apart from the plate 1 by the blocks 4, the plate 2 being further provided with the angular sides 2'.

Mounted centrally of the plate 1 is a bearing block or support 5, through which is connected and supported the vertical and rigid rod 6, having the semi-spherical bearing end 6', adapted to co-act with the lower end of the plug or rod 7, to form a single thrust bearing for the wheel W, and at the same time through the medium of the collar 8, and threaded portion 9 of the main wheel carrying tube or hub 10, retain the said wheel so that the tube will assume the position as shown in Fig. 7, where the lower end of the tube 10 is above and out of contact with the block 5, thus reducing the friction of the engaging parts to a minimum, and only between the points 6' and 7. From the shaft 7, power is transmitted to any desired machinery or transmission means.

Supported to the shaft 10 is a cylinder 11, carrying the upper and lower disks 12 and 13, respectively, and connected to the said disks and assisting in holding them spaced, are the two concentrically arranged series of vertical rods 14 and 17, the rods 14 having journaled thereon for horizontal swinging movements the inner blades, wings or paddles 15, which when the wheel is being rotated, as viewed in both Figs. 4 and 5, and when receiving the propulsive force of the water, have their inner ends *a* abut the vertical ribs 16, rigidly secured adjacent the circumference of the column 11, and radially in line with the rods 14 and 17. These vertical ribs or rods 16 are secured through the respective upper and lower disks 12 and 13 and surround the column or cylinder 11 so that the said column or cylinder 11 is properly supported between the said disks. By this means it will be seen that the said column or cylinder 11 will prevent the passage of water at the center of the wheel or motor and thereby provide a stop to assist in securing the maximum pressure or propulsive force from the water.

The outer blades, wings or paddles 18, have their outer ends journaled upon the rods 17, and are of sufficient length to when in operating alinement with their respective inner wing 15, abut the pivotal point of the said inner wing, and thereby form with said inner wing, a continuous water receiving blade or paddle constituted by the two wings, as clearly shown in Figs. 4 and 5. By this means it will be seen that the full impact and propulsive force is applied at the proper time and angle to give to the wheel the maximum power, the wings 15 and 17, after passing the position where they would be in a line, which is the longitudinal central line of the wheel, as viewed in said Figs. 4 and 5, being swung as indicated in said views so that the outer ends of the wings or blades leave their respective abutting points and the blade 18 swings outwardly beyond the peripheral edge of the wheel, while the wing 15 swings outwardly beyond the rod 14, thus reducing the spin friction of the blades or wings, when not receiving the propulsive force of the water, to a minimum, and as shown permitting four sets, or an equal number of blades 15 and 18 to act propulsively while the other are inactive and are being moved in position out of radial alinement.

In order to limit the outward swing of the blades, wings or paddles 18, a projection of pin 19, is projected downwardly from the upper disk of the wheel near the rods 17, to engage the blades when in the position as shown at $b$, Figs. 4 and 5, and by this means the said paddles are always in the proper position to return upon the proper side when moving into propulsive force receiving position.

The plates 20, as viewed in Fig. 6, are held in place by means of the rods 17, said plates each having an apron 21 to fit exteriorly of the peripheral edge of the lower disk 13, and provide a sleeve 22, to fit about the lower end of the rod 17, a rod 24, fitting in the apron 21, and projecting radially below the disk 13, where its hooked end 24′, engages the collar 25 carried upon the lower end of the cylinder 11, said rod forming a support for the swingingly mounted and radially depending blades or paddles 65 and 26, which are V-shaped in plan, and have their apices toward the center of the wheel, whereby the crowding of the water toward the center and below the disk 13 is avoided, these wings permitting the free flow of water from and across the center. When these wings are in propulsive force receiving position their outer straight edge $c$, abuts the lower ends 17′, of the rods 17, which cause them to be held vertical when so acting, but permit them to swing up and against the underside of the disk 13 when in the other position.

In order to conduct the water to the wheel automatically, as the tide changes or the flow of current changes, and cause rotation in the same direction of the wheel under all conditions, the two gates or valves 30 and 30′ are employed, these gates being pivoted upon the rods 29 and 29′, respectively and disposed to move toward and away from the angualr strips or stops 27 and 28, respectively, which form with the angular portions 2′, the stops for said gates, which when the flow of current is in direction of the arrow, Fig. 4, assume the positions there shown, whereby the current is prevented from flowing to the wheel from the gate 30′, but permitted to flow on the other side. In Fig. 5 the reverse is the case. Each gate is provided with a lower shoe or flange 31, which stiffens the gate and at the same time gives proper bearing upon the plate 1, and prevents leakage of water thereunder.

From the foregoing description taken in connection with the drawings, it is evident that a motor constructed according to this description will have the water directed at all times in such a direction, regardless of the direction of flow of the water, so as to impart to the wheel a rotation in one direction, thus making a motor especially desirable for use in utilizing the tide currents, but it is to be understood that the same may be used in a stream or operated by waves of the ocean, as the propulsive force of the waves may be directed by the gates 30 and 30′ to the blades of the wheel to impart to said wheel the desired single way rotation.

By mounting the wheel as shown in Fig. 7, the wheel friction is reduced to a minimum, and the lower end of the shaft thereof is held upwardly and out of friction contact with the lower plate of the motor.

What is claimed, is:—

A hydraulic motor having a wheel, composed of two circular disks spaced apart, two series of radially swinging blades disposed therebetween, one of each series forming a radius of the wheel when in water receiving position, a plate secured by the pivot of each outer blade to the outer edge of the lower disk and having a depending apron peripherally of the disk, a collar centrally of and below the lower disk, a rod having its ends journaled in each apron and upon said collar, and a swingingly depending blade journaled upon each rod and of reduced area toward the center of the wheel.

In testimony that I claim the foregoing as my own, I have hereto affixed my signature in the presence of two witnesses.

NIEL VICTOR JOHNSON.

Witnesses:
FRANK B. OCHSENREITER,
LENA WILLSON.

Copies of this patent may be obtained for five cents each, by addressing the "Commissioner of Patents, Washington, D. C."